United States Patent
Crawford

(10) Patent No.: US 10,784,744 B2
(45) Date of Patent: Sep. 22, 2020

(54) GRAVITY LINE POWER GENERATION SYSTEM INCLUDING AN OVERHEAD TROLLEY MECHANISM TO HARVEST KINETIC ENERGY FROM A WHEELED VEHICLE MOVING DOWN A SLOPE

(71) Applicant: Russell Wayne Crawford, Grand Junction, CO (US)

(72) Inventor: Russell Wayne Crawford, Grand Junction, CO (US)

(*) Notice: Subject to any disclaimer, the term of this patent is extended or adjusted under 35 U.S.C. 154(b) by 0 days.

(21) Appl. No.: 16/537,132

(22) Filed: Aug. 9, 2019

(65) Prior Publication Data
US 2020/0052554 A1  Feb. 13, 2020

Related U.S. Application Data

(60) Provisional application No. 62/717,595, filed on Aug. 10, 2018.

(51) Int. Cl.
*F03G 3/00* (2006.01)
*H02K 7/18* (2006.01)

(52) U.S. Cl.
CPC .......... *H02K 7/1853* (2013.01); *F03G 3/00* (2013.01); *H02K 7/1861* (2013.01)

(58) Field of Classification Search
None
See application file for complete search history.

(56) References Cited

U.S. PATENT DOCUMENTS

| | | | | |
|---|---|---|---|---|
| 4,895,079 A | * | 1/1990 | Beatty | B66D 1/50 104/174 |
| 7,944,075 B2 | * | 5/2011 | Boone | F03D 3/065 290/55 |
| 8,674,527 B2 | * | 3/2014 | Fyke | H02J 3/28 290/1 R |
| 9,394,885 B2 | * | 7/2016 | Vesely | F03D 9/14 |
| 9,581,135 B2 | * | 2/2017 | Harrington | F03D 5/02 |
| 2009/0173589 A1 | * | 7/2009 | Nejmeh | B60L 53/126 191/2 |
| 2011/0285147 A1 | * | 11/2011 | Fyke | H02J 15/00 290/1 R |
| 2014/0145451 A1 | * | 5/2014 | Burnaugh | F03G 7/10 290/1 R |
| 2015/0000547 A1 | * | 1/2015 | Bavaresco | B60R 16/0307 104/165 |
| 2015/0337810 A1 | * | 11/2015 | Vesely | F03D 9/28 290/1 R |
| 2017/0050646 A1 | * | 2/2017 | Blengini | B61B 12/022 |

(Continued)

FOREIGN PATENT DOCUMENTS

DE   102011008485 A1 * 7/2012 ............... F03G 3/00

*Primary Examiner* — Tulsidas C Patel
*Assistant Examiner* — S. Mikailoff
(74) *Attorney, Agent, or Firm* — Sheridan Ross P.C.

(57) ABSTRACT

A power generation system for the production of electric power or the accomplishment of other work objectives utilizes kinetic energy derived from the action of the force of gravity on a vehicle that is allowed to move along a power generation path having a downward grade. A tether cable connects the vehicle to a tether member that moves along a downhill line in response to the movement of the vehicle along the path, and the movement of the tether member operates a gearing mechanism that operates a machine to accomplish the work objective.

7 Claims, 8 Drawing Sheets

(56) References Cited

U.S. PATENT DOCUMENTS

| | | | |
|---|---|---|---|
| 2020/0052554 A1* | 2/2020 | Crawford | H02K 7/1853 |
| 2020/0090845 A1* | 3/2020 | Hagiwara | H01F 1/0577 |
| 2020/0109703 A1* | 4/2020 | Bhargava | F03G 3/00 |
| 2020/0119617 A1* | 4/2020 | Ali Lahib | H02K 7/1008 |

* cited by examiner

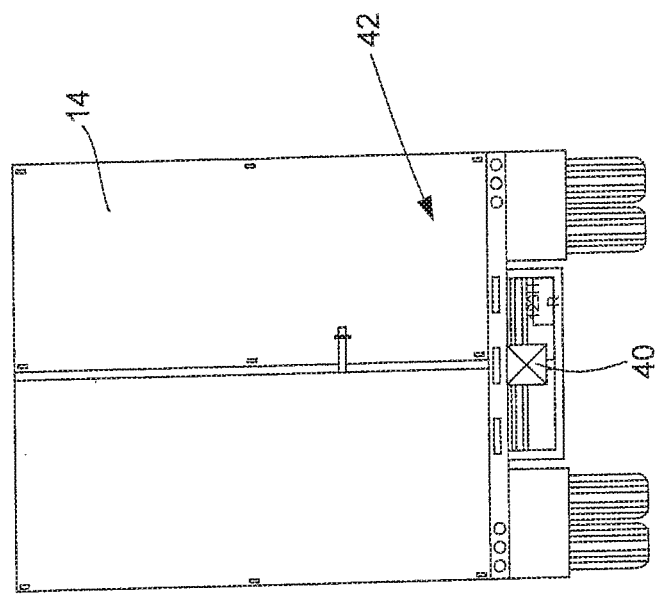
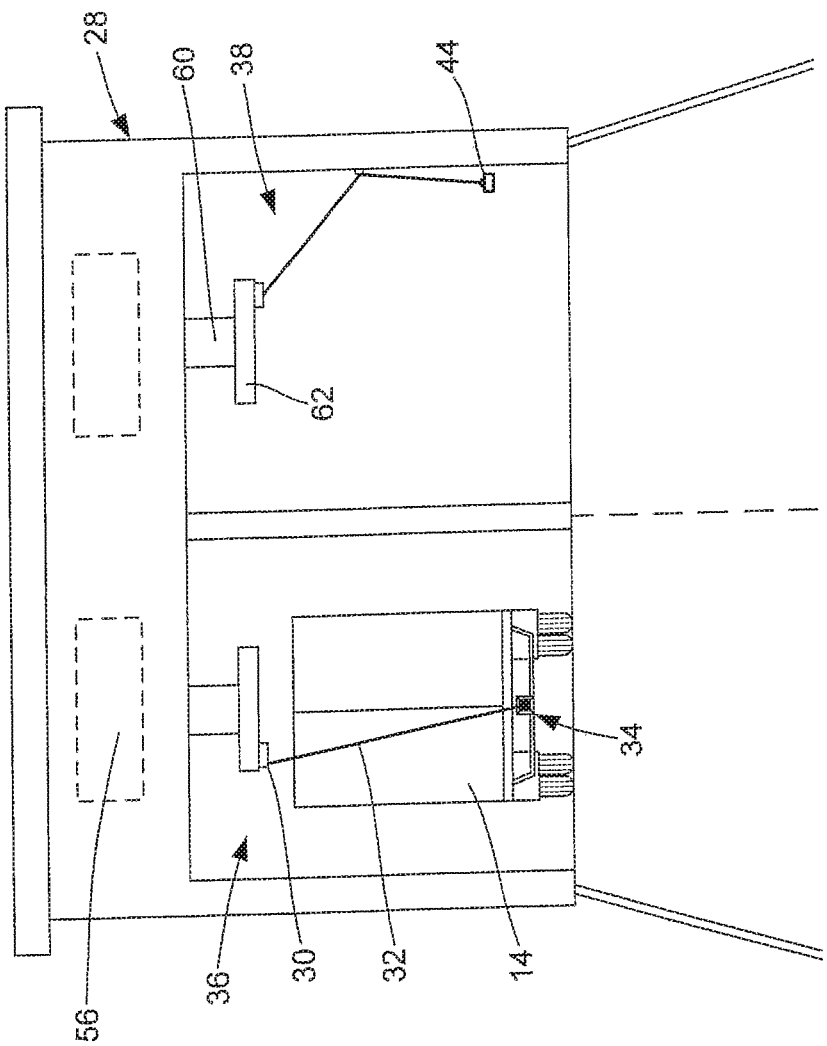

GRAVITY LINE POWER GENERATION SYSTEM INCLUDING AN OVERHEAD TROLLEY MECHANISM TO HARVEST KINETIC ENERGY FROM A WHEELED VEHICLE MOVING DOWN A SLOPE

CROSS-REFERENCE TO RELATED APPLICATION

This application claims the benefit under 35 U.S.C. § 119(e) of U.S. Provisional Patent Application 62/717,595, filed 10 Aug. 2018, the entirety of which is incorporated herein by reference.

FIELD OF THE INVENTION

The present invention relates generally to apparatuses and systems for generating power to perform work, and particularly to apparatuses and systems that utilize gravitational force, such as that resulting from downward movement of a vehicle, to generate power.

BACKGROUND OF THE INVENTION

Apparatuses and systems for converting a source of energy to power useful for generating electricity, turning a wheel, operating a machine (e.g. a pump, a grinding wheel, a drill, etc.), or otherwise performing work have been known for many centuries. In ancient times, the sources of energy most commonly used in such apparatuses and systems were people, animals, moving water, or wind, while in the modern era such apparatuses and systems, at least those on a commercial or industrial scale, are typically powered by oil, natural gas, coal, or fissile materials.

Most recently, there has been a strong desire in the art to provide apparatuses and systems to power machines, especially generators for producing electricity, by energy sources that are readily available, clean, and renewable, and that produce little waste. By way of non-limiting example, many skilled artisans have attempted to more beneficially utilize wind, solar energy, and geothermal energy as sources of power to operate electric generators. Although these sources of energy have been known and used to perform work for many decades (especially wind, which has been used to power sailing vessels for millennia), increased efforts to improve the efficiency of these energy systems in generating electricity are a relatively recent phenomenon.

The increased desire for apparatuses and systems that generate electricity without using non-renewable and/or polluting energy sources, e.g. fossil fuels, has in large part been a response to the realization that the supply of such energy sources is finite and that their use has had a negative impact on the environment. Nonetheless, given the vast array of common devices that run on electrical power (e.g. computers, air conditioning units, audio systems, kitchen appliances, etc.), consumers generally expect that electricity will be available to them whenever it is needed; thus, the overall demand for electricity is rapidly increasing, even as the energy sources most often used to generate it have become less available, more expensive, or otherwise disfavored. Moreover, as the populations of the developing world become wealthier, the number of people who have both the means and the desire to access electrically-powered devices such as computers and cell phones is also rapidly increasing. The desire to replace machines powered by dirty energy sources, including but not limited to cars, with electric equivalents contributes even further to the need for clean, renewable sources of electric power. At present, however, most countries still primarily rely on hydrocarbon-based fuels, including coal, oil, and natural gas, to provide the bulk of their electric power. Thus, as demand for electricity increases, so too does demand for fossil fuels and the like, increasing their cost, decreasing their availability, and increasing their impact on the environment.

One potential source of energy that has received relatively little attention, at least in recent times, is gravitational energy, which is naturally occurring and readily available and produces no waste or pollution. Devices that utilize gravitational forces as a source of power, such as gravity motors and the like, typically rely on the gravitational force of one or more moving weights to create a force imbalance that produces a torque, which is harnessed to power a generator, pump, wheel, or other machine. Gravity-powered systems have the potential to provide several important advantages, chief among which is their reliance on a constant and universal force rather than the variable or unpredictable availability of moving water or wind.

A well-known limitation of gravity-powered systems is that the one or more weights on which gravitational forces act to create a force imbalance (and, thus, a torque) must first be placed into a position where they will move as a result of gravity; for example, the use of the force of a falling object to operate a machine requires that the object first be placed into a position from which it will fall. Necessarily, this placement requires an expenditure of energy to lift the object to its resting position, and by the laws of thermodynamics, any system that attempts to utilize the force of gravity as a source of work will consume at least as much energy as it produces if it must return a falling object from an ending position to a starting one. Thus, any gravity-powered system should utilize natural or otherwise preexisting sources of falling weight, such as a waterfall.

One potential preexisting source of gravitational energy is the movement of vehicles along a downward slope of a road or track. Because these vehicles are in motion as a result of exogenous causes, their movement may be harnessed as a source of power, e.g. electrical power. While a number of prior art systems have sought to utilize this possible source of energy by positioning an apparatus in, on, or along a road or rails, such that the movement of the vehicle over the apparatus operates a mechanism that produces electricity, such systems have generally suffered from mechanical and cost concerns that have limited their practical applicability.

There is thus a need in the art for improved systems for performing work, especially to generate electricity, that utilize the preexisting or exogenous movement of vehicles as a source of energy and that effectively transfer kinetic energy of the vehicle to a generator or other machine without requiring significant modification to the vehicle or to the road or track on which it travels. It is further advantageous for such systems to require little or no effort by the operator of the vehicle, be suitable for producing significant quantities of electrical power or other work, and require little or no investment in new transport infrastructure.

SUMMARY OF THE INVENTION

It is one aspect of the present invention to provide a power generation system, comprising a power generation path having a downward grade; and a power transfer mechanism, configured to engage with a vehicle while the vehicle moves downwardly along the power generation path from a first position to a second position and to transfer at least a portion of kinetic energy generated by the downward movement of the vehicle to a machine operatively connected to the power transfer mechanism, wherein the at least a portion of the kinetic energy powers the machine to accomplish a work objective.

In embodiments, the machine may be an electric generator and the work objective may be generation of electric power.

In embodiments, the power transfer mechanism may comprise an overhead trolley mechanism, the overhead trolley mechanism comprising at least one tether cable configured to be interconnected to the vehicle. The overhead trolley mechanism may but need not further comprise a tether member, the tether member may but need not be movably connected to a downhill line and configured to move along the downhill line from the first position to the second position, and the at least one tether cable may but need not be configured to interconnect the vehicle to the tether member; optionally, wherein the tether member may be operatively connected to a gearing mechanism and the gearing mechanism may be operatively connected to the machine. The overhead trolley mechanism may but need not further comprise a return line configured to return the tether member from the second position to the first position; optionally, the overhead trolley mechanism may further comprise a plurality of towers, each tower comprising a support arm configured to support the downhill line and the return line. The power generation system may, but need not, further comprise a connecting mechanism configured to interconnect the at least one tether cable to the vehicle at the first position and disconnect the at least one tether cable from the vehicle at the second position.

In embodiments, the power transfer mechanism may comprise a sled member configured to move from the first position to the second position along a track. The sled member may but need not be sized and configured to receive the vehicle thereon.

It is another aspect of the present invention to provide a power generation system, comprising a power generation path having a downward grade; an overhead trolley mechanism, comprising (i) a tether cable configured to releasably interconnect to a vehicle while the vehicle moves downwardly along the power generation path from a first position to a second position, the downward movement of the vehicle generating kinetic energy, and (ii) a tether member configured to be moveably connected to a downhill line, wherein the tether cable interconnects the vehicle and the tether member, wherein the tether member is configured to move along the downhill line from the first position to the second position and thereby operate a gearing mechanism operatively connected to a machine to accomplish a work objective; and a releasable connecting mechanism, configured to releasably interconnect the tether cable to the vehicle.

In embodiments, the machine may be an electric generator and the work objective may be generation of electric power.

In embodiments, the overhead trolley mechanism may further comprise a return line configured to return the tether member from the second position to the first position.

In embodiments, the overhead trolley mechanism may further comprise a plurality of towers, each tower comprising a support arm configured to support the downhill line and the return line.

It is another aspect of the present invention to provide a method for generating power, comprising a) connecting a tether cable to a vehicle at a tether station, wherein the tether cable is interconnected to a tether member moveably disposed on an overhead trolley mechanism and the tether member is interconnected to a machine; b) allowing the vehicle to move downwardly, due to the weight of the vehicle, along a power generation path from a first position at a starting point of the power generation path, wherein the power generation path has a downward grade; c) as a result of the downward motion of the vehicle, pulling the tether member to operate the machine and thereby accomplish a work objective; and d) disconnecting the tether cable from the vehicle at a second position at an ending point of the power generation path.

In embodiments, the vehicle may be in an unpowered or low-powered mode during step b).

In embodiments, the machine may be an electric generator and the work objective may be generation of electric power.

In embodiments, the overhead trolley mechanism may comprise a return line configured to return the tether member to the first position.

In embodiments, the tether member may be operatively connected to a gearing mechanism configured to operate the machine.

In embodiments, the overhead trolley mechanism may comprise a plurality of towers, each tower having a support arm configured to support a downhill line and a return line, and the tether member may be configured to move down the power generation path along the downhill line and up the power generation path along the return line.

BRIEF DESCRIPTION OF THE DRAWINGS

FIG. 3 is an end view of an entrance to a tether station of the power generation system illustrated in FIG. 1, illustrated with a vehicle in a first bay and a vacant second bay.

FIG. 4 is a back view of a vehicle, with a tether plate attached thereto, that can be utilized in conjunction with the power generation system illustrated in FIG. 1.

DETAILED DESCRIPTION OF THE INVENTION

Figure 1:
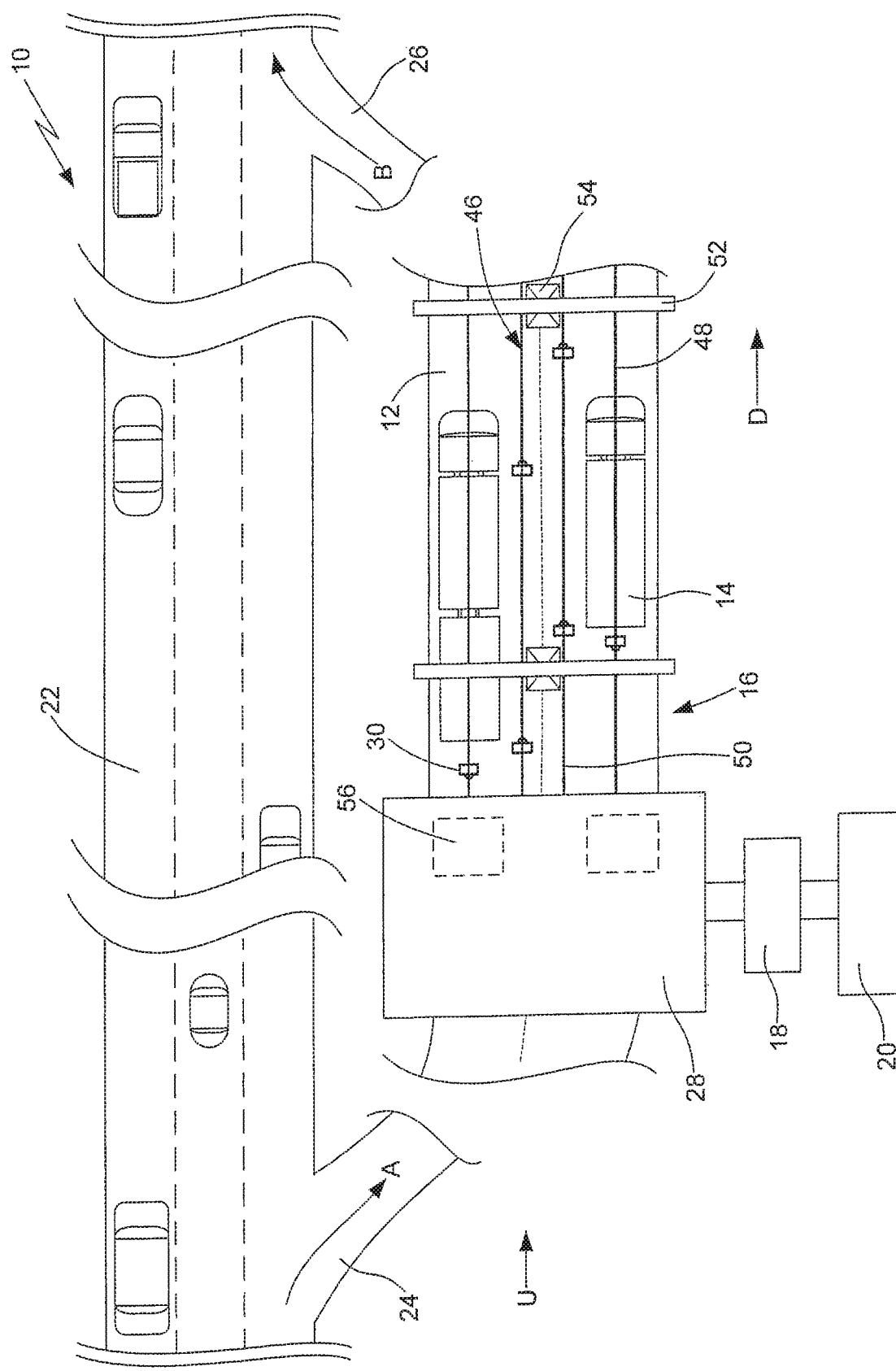
FIG. 1 is a plan view of a gravity line power generation system, according to embodiments of the present invention.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

As used herein, the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As used herein, the terms "grade," "gradient," "incline," "pitch," "slope," and "tilt" are interchangeable and each refer to an angle of a surface of a landform or other physical feature relative to a horizontal axis or plane. A positive grade may be referred to as an "upward" grade, and a negative grade may be referred to as a "downward" grade.

FIGS. 1 through 7 illustrate a gravity line power generation system 10 according to embodiments of the present invention. The power generation system 10 generally comprises a power generation path 12, on which a vehicle 14 moves, and a power transfer mechanism 16, which transfers energy resulting from the movement of the vehicle 14 along the power generation path 12 to a machine 18. In the embodiment illustrated in FIG. 1, the machine 18 is an electrical generator that is configured to generate electricity and transfer the electricity to a power grid 20, but the machine 18 may be any device used to perform work, including but not limited to an alternator, a pump, and/or a wheel. Typically, the power generation path 12 is located alongside a road 22, including but not limited to a highway, freeway, or the like, which has an exit path 24 that allows the vehicle 14 to exit from the road 22 and an entrance path 26 that allows the vehicle 14 to enter the road 22. The vehicle 14 is most commonly a commercial truck or other large vehicle, particularly one operated by a professional driver, but any type of land vehicle is suitable for use as the vehicle 14 of the power generation system 10.

In many embodiments of the present invention, it may be advantageous to locate the power generation system 10 of the present invention at or near the summit of a pass, hill, mountain, or similar natural landform, i.e. a point where an upward grade of the road 22 (illustrated as U in FIGS. 1 and 2) ends and a downward grade of the road 22 (illustrated as D in FIGS. 1 and 2) begins. The downward grade D of the road 22 provides the power generation path 12 with a generally downward grade, illustrated as G in FIG. 2, and the length of the power generation path 12 is maximized when the power generation system 10 is placed at or near the top of a hill or similar landform, but the power generation system 10 can be located at any point where the downward grade G of the power generation path 12 is sufficient to achieve the objectives of the present invention. As described in more detail below, a portion of the kinetic energy of the vehicle 14 as it moves downwardly along the power generation path 12 is transferred via the power transfer mechanism 16 to the machine 18, in this case an electric generator.

In the embodiment illustrated in FIGS. 1 through 7, the power transfer mechanism 16 comprises a tether station 28 where the vehicle 14 and the power transfer mechanism 16 are interconnected, at least one tether member 30 that moves in response to the downward movement of the vehicle 14 along the power generation path 12, a tether cable 32 that interconnects the tether member 30 and the vehicle 14, and a connecting mechanism 34 that connects the tether cable 32 to the vehicle 14. As illustrated in FIG. 3, the tether station 28 comprises at least one tether station or bay, in this case a first bay 36 and a second bay 38, where the vehicle 14 and the power transfer mechanism 16 are physically interconnected. The bays 36, 38 are configured to permit the vehicle 14 to pull into a bay 36 or 38 after exiting the road 22 via the road exit path 24; in one embodiment, the vehicle 14 need only slow down, and not come to a complete stop, to enable the interconnection to power transfer mechanism 16.

The connecting mechanism 34 comprises a first connector element 40, disposed on a rear portion 42 of the vehicle 14, and a second connector element 44, disposed at the end of the tether cable 32. In embodiments, the first connector element 40 comprises a plate made of steel or other ferrous material and the second connector element 44 comprises an electromagnet that magnetically engages the plate of the first connector element 40, and/or the first and second connector elements 40, 44 comprise cooperatively configured mechanical devices that securely interconnect the tether cable 32 to the rear portion 42 of the vehicle 14, but any type of connecting device known to those of skill in the art may be utilized. In embodiments, an overhead digital readout may be provided inside the tether station 28 to inform the driver of the vehicle 14 that the vehicle 14 is securely interconnected to the tether cable 32.

Figure 2:
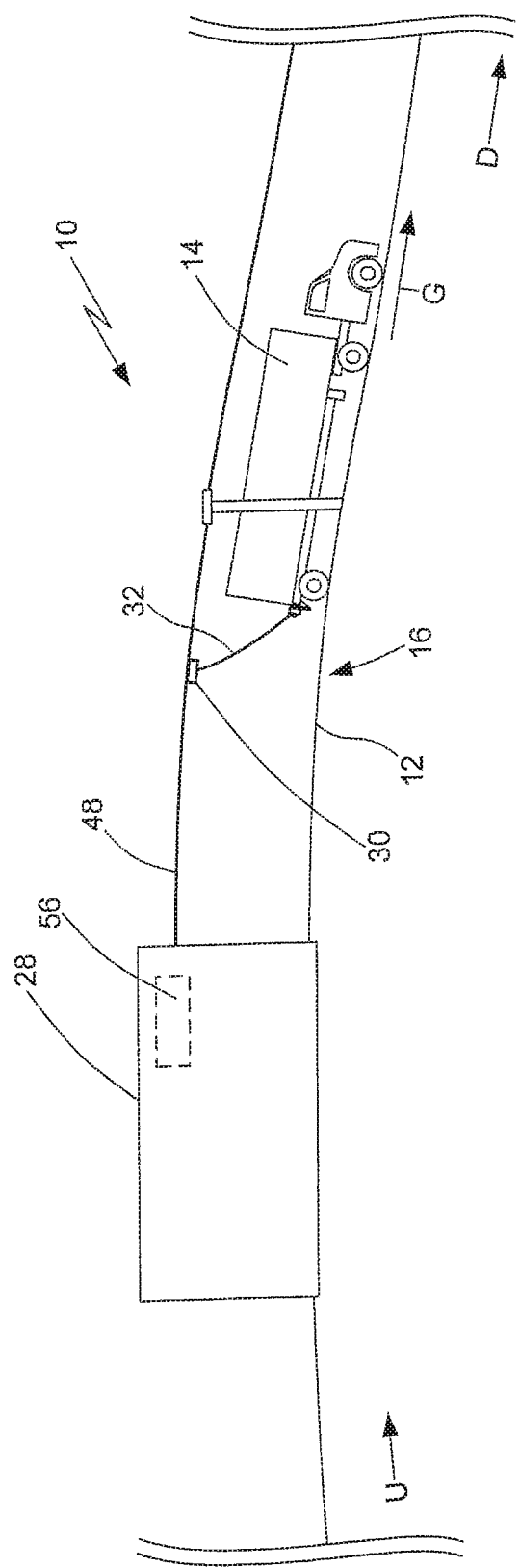
FIG. 2 is a side view of the power generation system illustrated in FIG. 1 showing a downward grade of a power generation path.
Figure 5:
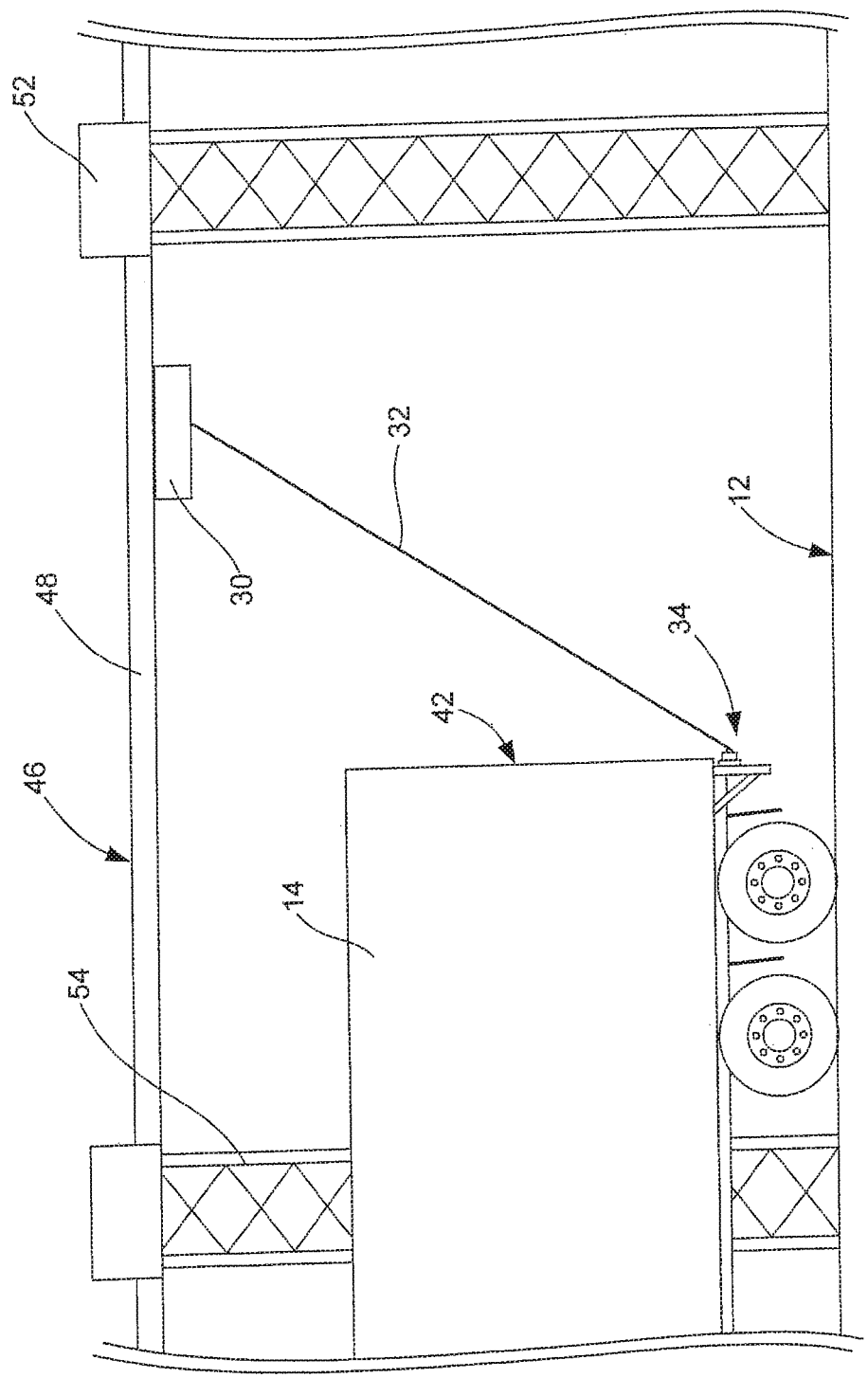
FIG. 5 is a side view of a vehicle attached to a tether member and moving along the power generation path illustrated in FIG. 2.
Figure 6:
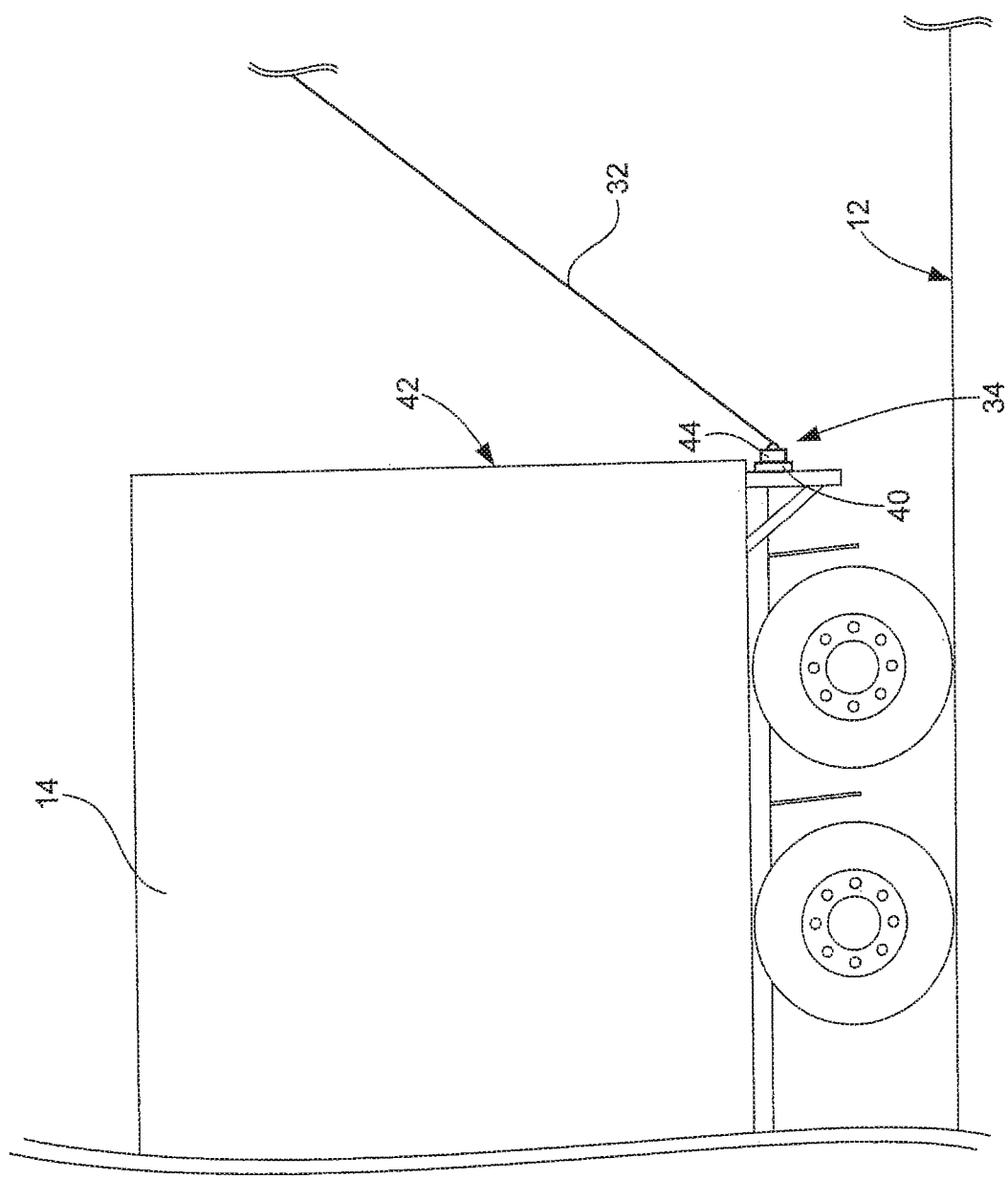
FIG. 6 is an enlarged side view of the vehicle and tether mechanism illustrated in FIG. 5, illustrating the use of the connecting mechanism to connect the vehicle to the tether member.
Figure 7:
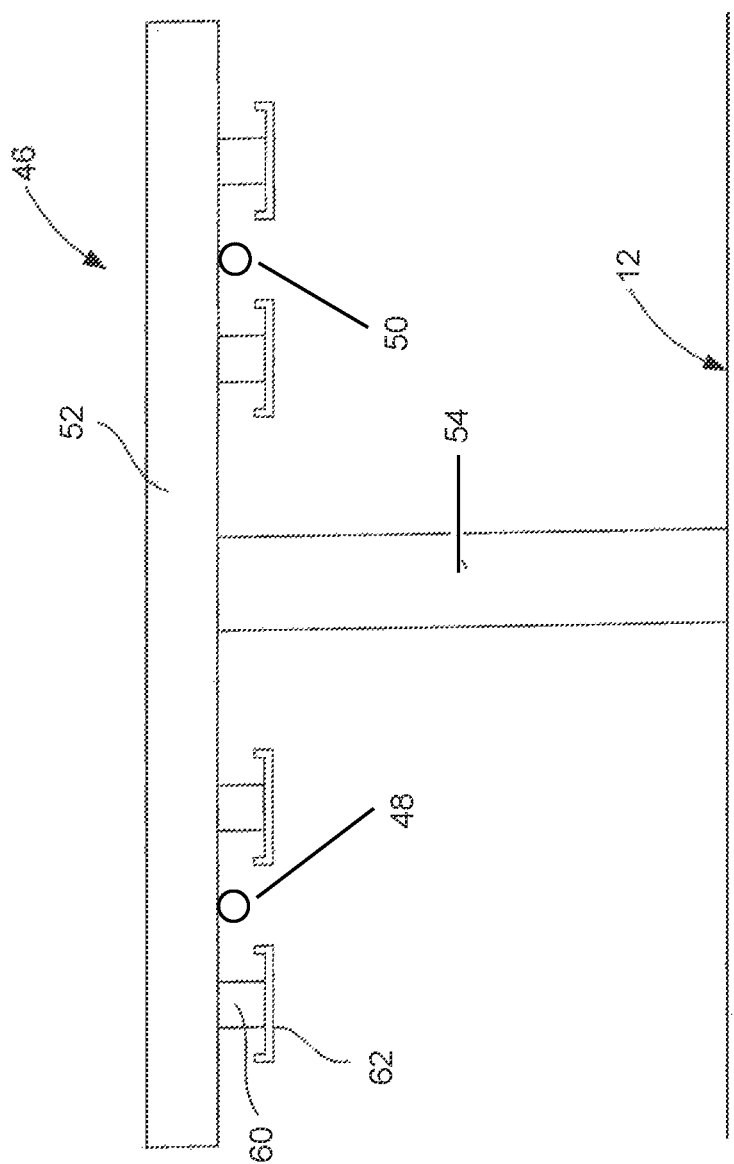
FIG. 7 is an end view of a tower arrangement for the tether mechanism illustrated in FIG. 1 and a downhill rail and a return rail attached thereto.

As illustrated in FIGS. 1, 2, and 5, the tether member 30 is operatively connected to an overhead trolley mechanism 46 comprising a first (or downhill) line 48 and a second (or return) line 50, which are connected to and spaced apart from each other by support arms 52, which in turn are supported above the power generating path 12 by a plurality of towers 54. The tether member 30 is configured to cooperate with both the downhill line 48 (such that the tether member 30 moves along the downhill line 48 in tandem with the movement of the vehicle 14) and the return line 50 (such that the tether member is operatively returned to the tether station 28 along the return line 50), as illustrated in FIG. 1. The tether member 30 is also operatively connected to a gearing mechanism 56 that converts the downward force exerted on the tether member 30 as it moves along downhill line 48 into motion suitable for operating the machine 18. The gearing mechanism 56 may also be configured to return the tether member 30 to the tether station 28 on the return line 50. The overhead trolley mechanism 46 may be configured to control, via the tether member 30 and the tether cable 32, the descent of the vehicle 14 down the power generating path 12 such that the vehicle 14 may be placed in a neutral gear or other unpowered or low-power mode during its descent, thereby reducing the quantity of energy consumed by the vehicle 14 and especially the braking systems thereof. The tether member 30 may be connected to the gearing mechanism 56 via a gearing cable 58, illustrated in FIGS. 9 and 10, which operatively interconnects to the gearing mechanism 56 such that the downward motion of the vehicle 14 is converted into useful work for the machine 18 and then into a desired work objective (e.g. the use of a generator to generate electricity).

Figure 8:
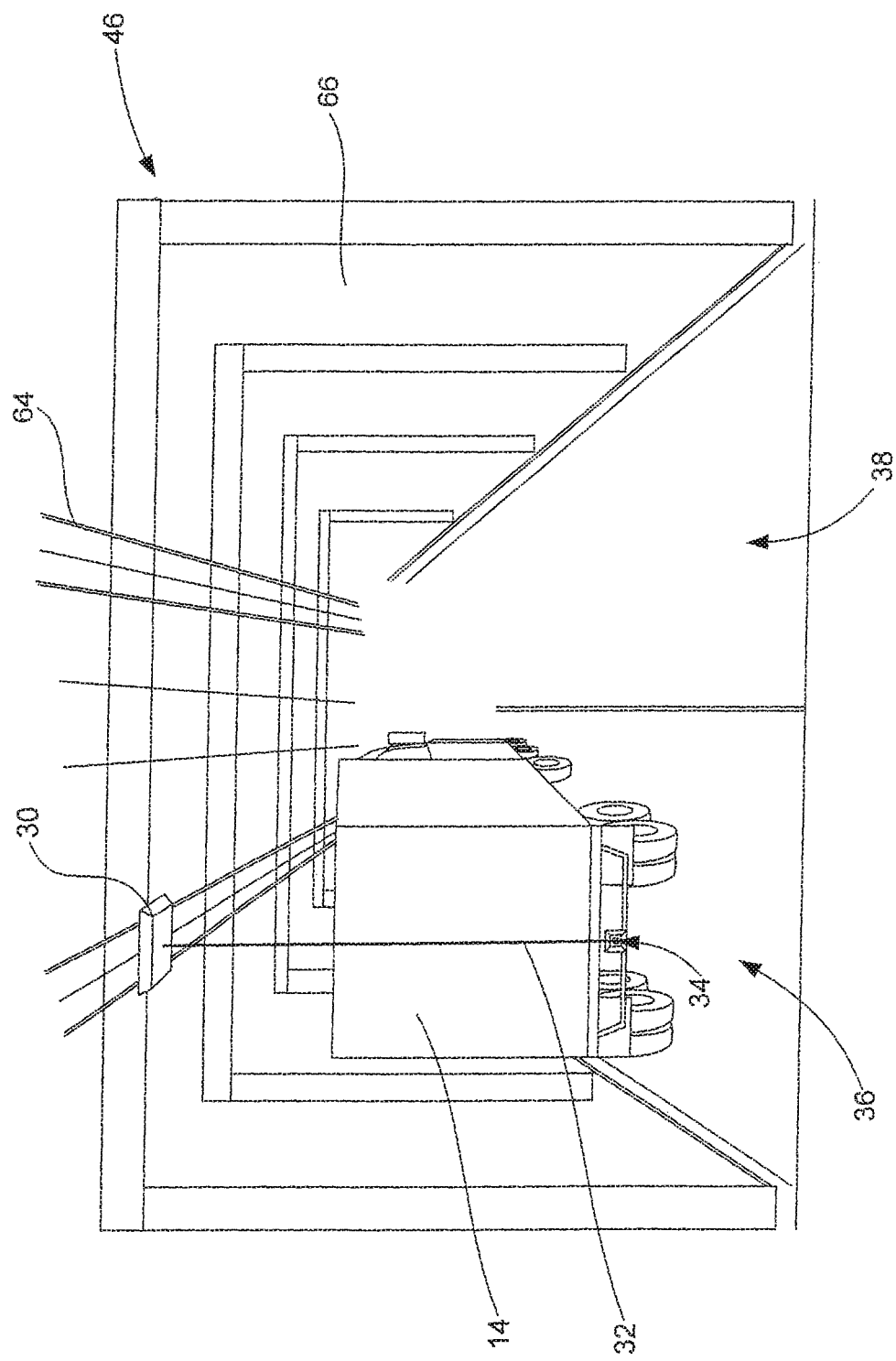
FIG. 8 is an end view of a shed mechanism of a power generation system, according to embodiments of the present invention.

In embodiments, the towers 54 may be configured to dispose the support arms 52 a sufficient distance above the power generating path 12 to allow the vehicle 14 to pass underneath the support arms 52 without interfering with the operation of the overhead trolley mechanism 46. Most commonly, the support arms 52 have one or more lines extending downwardly therefrom, such lines comprising at least one extension member 60 that supports rails 62 defining the downhill line 48 and the return line 50. In the embodiment illustrated in FIG. 8, the tether member 30 is supported by trolley lines 64, and a shed is utilized to substantially enclose the power generation system 10. This configuration of the overhead trolley mechanism 46 is non-limiting, and many varying configurations are contemplated as being within the scope of the invention.

When the power generation system 10 is in use, the driver of the vehicle 14 exits the road 22 onto the road exit path 24 and slows down to enter the tether station 28 to allow the second connector element 44 to attach to the first connector element 40 at a rear portion 42 of the vehicle 14, thereby securely interconnecting the tether cable 32 to the vehicle 14. Once the driver has been made aware that the tether cable 32 is securely interconnected to the vehicle 14, by any suitable means including but not limited to an overhead digital readout, the driver then proceeds through the tether station 28 to a starting point of the power generation path 12, and then may, in embodiments, place the vehicle in a neutral gear or other unpowered or low-power mode, which may advantageously result in fuel savings. Due to the downhill grade G of the power generation path 12, the vehicle 14 then travels, by the force of its own weight, down the power generation path 12.

Figure 9:
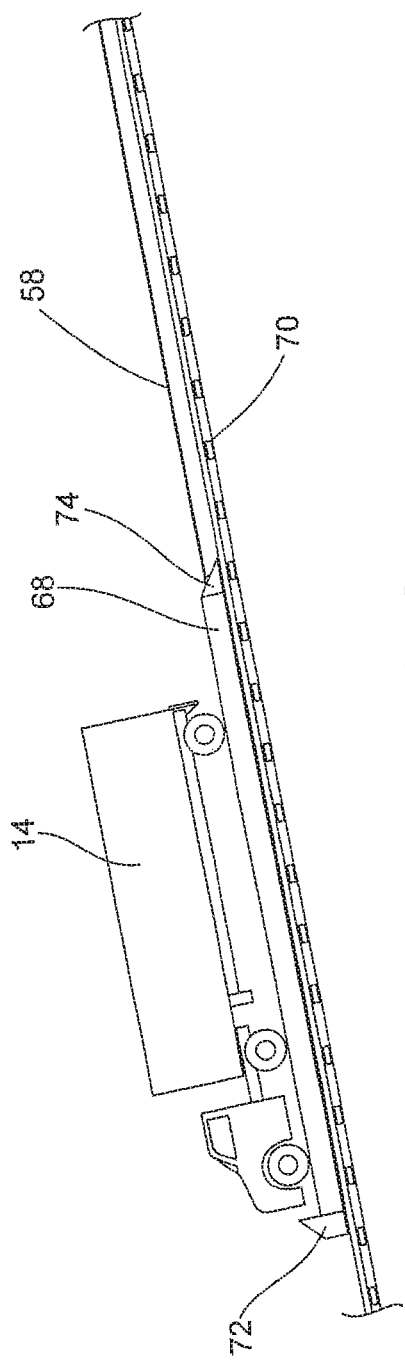
FIG. 9 is a side view of a power generation system that utilizes a vehicle mounted on a sled mechanism, according to embodiments of the present invention.
Figure 10:
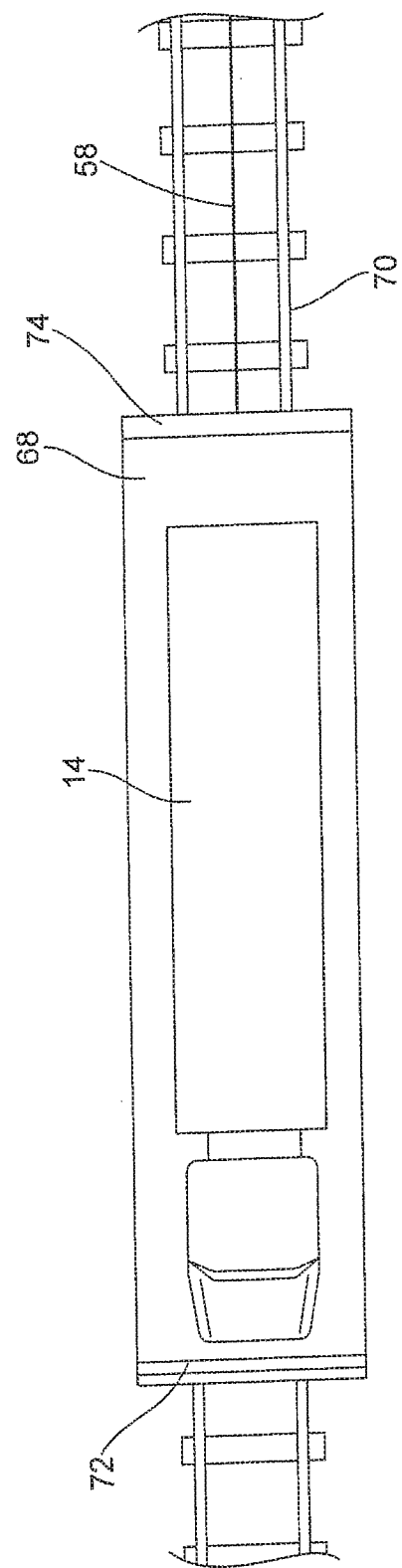
FIG. 10 is a top view of the sled mechanism illustrated in FIG. 9.

The overhead trolley mechanism 46, via the tether cable 32 connected to the vehicle 14, may control the rate of descent of the vehicle 14, which may eliminate the need for the driver to apply the brakes of the vehicle 14 and thus save additional fuel and reduce wear and tear on the vehicle 14. As the vehicle 14 moves downwardly along the power generation path 12, the tether cable 32 pulls on the tether member 30, causing the tether member 30 to pull or otherwise move the downhill line 48 of the overhead trolley mechanism 46. The downward movement of the tether member 30 engages the gearing mechanism 56, for example by pulling on the downhill line 48 (as illustrated in FIGS. 1, 2, and 5) or on the gearing cable 58 (as illustrated in FIGS. 9 and 10), which operatively engages the machine 18 (e.g. an electric generator) to accomplish a work objective (e.g. generating electricity to feed to a power grid 20) When the vehicle 14 reaches an ending point of the power generation path 12, the tether cable 32 is automatically disconnected from the vehicle 14; this automatic disconnection may be accomplished by any suitable means, including but not limited to the same electromagnetic or mechanical mechanism as is used to interconnect the first and second connector elements 40, 44.

Once the driver has been made aware that the tether cable 32 has been disconnected from the vehicle 14, by any suitable means including but not limited to an overhead digital readout, the driver then proceeds along the road entrance path 26 to rejoin traffic on the road 22. If desired, an overhead digital readout that informs the driver that the tether cable 32 has been disconnected from the vehicle 14 may also display additional information, such as messages instructing the driver to proceed with caution.

Where the power generation system 10 is located on a particularly busy road 22, such as a highway or freeway, the movement of many vehicles 14 (on some particularly high-traffic stretches of urban freeways, hundreds of thousands of vehicles 14 per day) along the power generation path 12 may be capable of providing very large quantities of usable energy to the machine 18. The electricity or other useful work produced by power generation system 10 is clean and readily available, and may be installed as replacements for dirty and/or unreliable systems.

In addition to the advantages of the electricity or other work produced by the power generation system 10 of the present invention, the drivers of the vehicles 14 that utilize the power generation system 10 also reap benefits. As discussed above, vehicles 14 consume less fuel and rely less heavily on their braking systems as they descend the power generation path 12 than they otherwise would while descending the road 22; the downward grade G of the power generation path 12 is sufficient to allow the vehicle 14 to roll downwardly by the force of its own weight, while the overhead trolley mechanism 46 prevents the vehicle 14 from descending in an uncontrolled fashion or at an excessive speed. The reduced fuel consumption and wear on the braking system in turn reduce maintenance and other costs associated with operation of the vehicle 14. Additionally, traffic on the road 22 that does not utilize the power generation system 10 benefits by having some portion of traffic, often larger and/or slower vehicles, removed from a portion of the road 22, thereby reducing congestion.

Referring now to FIGS. 9 and 10, a sled member 68 is configured to move along a track 70 that is placed over the power generation path 12 such that it has the same downward grade G. The sled member 68 is interconnected to the gearing cable 58 such that the downward movement of the sled member 68 along the track 70 operates the gearing mechanism 56 to cause the machine 18 to achieve a desired work objective. In one embodiment, a front portion 72 of the sled member 68 is configured to prevent the driver from driving the vehicle 14 over the sled member 68 when inside the tether station, and then to fold down to allow the driver to exit the sled member 68 at the bottom of the power generation path 12. A rear portion 74 of the sled member 68 may be sloped to allow the vehicle 14 to easily drive onto the sled member 68.

The embodiment illustrated in FIGS. 9 and 10 may provide additional advantages and benefits, foremost among which is that the vehicle 14 does not roll down the power generation path 12 but merely sits atop the sled member 68 as the sled member 68 travels along the track 70; the need for the vehicle 14 to be directly tethered to the power generation system 10 is thereby eliminated. As in the above embodiments, the power generation system 10 may be configured as a continuous loop, i.e. with a downhill portion and a return portion, so that vehicles 14 are not unnecessarily delayed in traveling down the power generation path 12. In use, the driver drives the vehicle 14 onto the sled member 68, places the vehicle 14 in a neutral gear or other unpowered or low-powered mode, and engages a braking system of the vehicle 14. With the vehicle 14 atop, the sled member 68 then moves down the track 70, which is disposed above the power generation path 12 and has the same downward grade G, to operate the gearing mechanism 56 and power the machine 18. At least one gearing cable 58 may interconnect the sled member 68 and the gearing mechanism 56. At a bottom or ending point of the power generation path 12, the front portion 72 of the sled member 68 lowers to allow the driver to drive the vehicle 14 off of the sled member 68 and rejoin the traffic moving along the road 22.

While the present disclosure shows and describes various aspects, embodiments, features, and forms of the invention, it is to be expressly understood, and will be readily apparent to those skilled in the art, that the invention is not limited to aspects, embodiments, features, and forms shown and described herein, but that various additions, alternatives, modifications, and rearrangements may be made without departing from the scope of the invention. Particularly, the embodiments shown and described herein are subject to modification with regard to any assembly method, dimension, material, shape, size, spatial orientation or configuration, or use. Likewise, numerous components described herein may be replaced by components having equivalent functions, and such alternatives and/or substitutions are within the scope of the present invention.

The invention claimed is:

1. A power generation system, comprising:
   an exit road for diverting a wheeled vehicle from a main road for vehicular traffic to a tether station;
   a power generation path, connecting to the exit road at the tether station, the power generation path comprising a road having a downward grade;
   an overhead trolley mechanism, comprising
   (i) a tether cable configured to be releasably interconnected to the wheeled vehicle while the vehicle moves downwardly, due to weight of the vehicle, along the power generation path from a first position to a second position, the downward movement of the vehicle generating kinetic energy, and
   (ii) a tether member connected to a moveable downhill line, wherein the tether cable interconnects the vehicle and the tether member, wherein the tether member is configured to pull the downhill line, as the vehicle moves downwardly from the first position to the second position, and thereby operate a gearing mechanism operatively connected to an electric generator to thereby convert the kinetic energy of the vehicle to electric power;
   a releasable connecting mechanism, for releasably interconnecting the tether cable to the vehicle from the first position to the second position, and allowing disconnection of the vehicle from the tether cable at the second position; and
   an entrance road for returning the wheeled vehicle, after disconnection from the tether cable, back to the main road.

2. The power generation system of claim 1, wherein the overhead trolley mechanism further comprises a return line configured to return the tether member from the second position to the first position.

3. The power generation system of claim 2, wherein the overhead trolley mechanism further comprises a plurality of towers, each tower comprising a support arm configured to support the downhill line and the return line.

4. A method for generating electrical power, comprising:
   a) diverting a wheeled vehicle, from a main road for vehicular traffic, along an exit road to a tether station;
   b) connecting a tether cable to the wheeled vehicle at the tether station, wherein the tether cable is interconnected to a tether member moveably disposed, via a moveable downhill line, on an overhead trolley mechanism and the downhill line is interconnected to an electric generator via a gearing mechanism;
   c) allowing the wheeled vehicle to move downwardly, due to weight of the vehicle, along a power generation path from a first position at a starting point of the power generation path to a second position at an ending point of the power generation path, wherein the power generation path comprises a road having a downward grade;
   d) as a result of the downward motion of the vehicle, pulling the tether member to thereby pull the downhill line to operate the electric generator and thereby generate the electrical power; and
   e) disconnecting the tether cable from the wheeled vehicle at the second position at the ending point of the power generation path; and
   f) returning the wheeled vehicle back to the main road via an entrance road.

5. The method of claim 4, wherein the vehicle is in an unpowered or low-powered mode as the vehicle is moving downwardly along the power generation path.

6. The method of claim 4, wherein the overhead trolley mechanism further comprises a return line configured to return the tether member from the second position to the first position.

7. The method of claim 4, wherein the overhead trolley mechanism further comprises a plurality of towers, each tower having a support arm configured to support both the downhill line and a return line, wherein the return line is configured to return the tether member from the second position to the first position.

* * * * *